US009005831B2

(12) United States Patent
Åström

(10) Patent No.: US 9,005,831 B2
(45) Date of Patent: Apr. 14, 2015

(54) OFFSET CONTROL ARRANGEMENT AND METHOD FOR CONTROLLING VOLTAGE VALUES IN A FUEL CELL SYSTEM

(71) Applicant: Convion Oy, Espoo (FI)

(72) Inventor: Kim Åström, Kirkkonummi (FI)

(73) Assignee: Convion Oy, Espoo (FI)

( * ) Notice: Subject to any disclaimer, the term of this patent is extended or adjusted under 35 U.S.C. 154(b) by 0 days.

(21) Appl. No.: 14/137,625

(22) Filed: Dec. 20, 2013

(65) Prior Publication Data
US 2014/0178783 A1 Jun. 26, 2014

Related U.S. Application Data

(63) Continuation of application No. PCT/FI2012/050396, filed on Apr. 20, 2012.

(51) Int. Cl.
*H01M 8/04* (2006.01)
*H01M 8/24* (2006.01)
*H01M 8/12* (2006.01)

(52) U.S. Cl.
CPC ............ *H01M 8/04* (2013.01); *H01M 8/04559* (2013.01); *H01M 8/0488* (2013.01); *H01M 8/249* (2013.01); *H01M 2008/1293* (2013.01); *Y02E 60/50* (2013.01); *Y02E 60/525* (2013.01)

(58) Field of Classification Search
USPC ........................... 429/429, 432; 324/691, 713
See application file for complete search history.

(56) References Cited

U.S. PATENT DOCUMENTS

| | | |
|---|---|---|
| 2003/0091882 A1 | 5/2003 | Schmidt et al. |
| 2005/0074649 A1 | 4/2005 | Skiba et al. |
| 2007/0275276 A1 | 11/2007 | Saeki et al. |
| 2008/0075988 A1 | 3/2008 | Suzuki et al. |

FOREIGN PATENT DOCUMENTS

| | | |
|---|---|---|
| EP | 2293404 A2 | 3/2011 |
| WO | WO 2011/004057 A1 | 1/2011 |
| WO | WO 2011/004058 A1 | 1/2011 |

OTHER PUBLICATIONS

International Search Report (PCT/ISA/210) mailed on Jul. 16, 2012, by the European Patent Office as the International Searching Authority for International Application No. PCT/FI2012/050396.
International Preliminary Report on Patentability (PCT/IPEA/409) mailed on Jun. 18, 2013, by the European Patent Office as the International Examining Authority for International Application No. PCT/FI2012/050396.
Finnish Search Report issued Jan. 16, 2012 for Finnish Application No. 20115669.

*Primary Examiner* — Carlos Barcena
(74) *Attorney, Agent, or Firm* — Buchanan Ingersoll & Rooney PC

(57) ABSTRACT

An offset control arrangement is disclosed for controlling voltage values in a fuel cell system including an anode side, a cathode side and an electrolyte between the anode side and the cathode side. The fuel cell system can include at least one fuel cell array of at least two fuel cells, and at least one load for performing load function. The offset control arrangement can include voltage monitoring for monitoring an input voltage of the load, a control processor for processing the monitoring information, and at least one offsetting source in serial connection to the at least one fuel cell array, with a power level of the offsetting source being substantially low compared to the power level of the fuel cell array, and the offsetting source being arranged to perform at least unidirectional shifting of fuel cell array output voltage.

18 Claims, 4 Drawing Sheets

OFFSET CONTROL ARRANGEMENT AND METHOD FOR CONTROLLING VOLTAGE VALUES IN A FUEL CELL SYSTEM

RELATED APPLICATIONS

This application claims priority as a continuation application under 35 U.S.C. §120 to PCT/FI2012/050396, which was filed as an International Application on Apr. 20, 2012 designating the U.S., and which claims priority to Finnish Application No. 20115669 filed in Finland on Jun. 23, 2011. The entire contents of these applications are hereby incorporated by reference in their entireties.

FIELD

Because of environmental concerns, new energy sources that are environmentally friendly and have good efficiency have been developed. Fuel cell devices are promising future energy conversion devices by which fuel, such as bio gas, can be directly transformed into electricity via a chemical reaction in an environmentally friendly process.

BACKGROUND INFORMATION

A known fuel cell, as presented in FIG. 1, can include an anode side 100, a cathode side 102 and an electrolyte material 104 between them. In solid oxide fuel cells (SOFCs), oxygen is fed to the cathode side 102 and reduced to a negative oxygen ion by receiving electrons from the cathode. The negative oxygen ion goes through electrolyte material 104 to the anode side 100 where it reacts with the used fuel to produce water and carbon dioxide ($CO_2$). Between the anode 100 and the cathode 102 is an external electric circuit 111 including a load 110 for the fuel cell.

In FIG. 2 is presented a SOFC device as an example of a high temperature fuel cell device. SOFC devices can utilize for example natural gas, bio gas, methanol or other compounds containing hydrocarbon mixtures as fuel. The SOFC device system in FIG. 2 can include multiple fuel cells in one or more stack formations 103 (SOFC stack(s)).

A larger SOFC device system can include many fuel cells in several stacks 103. Each fuel cell includes an anode 100 and cathode 102 structures as presented in FIG. 1. Part of the used fuel may be recirculated in a feedback arrangement 109. The SOFC device in FIG. 2 also includes a fuel heat exchanger 105 and a reformer 107. Heat exchangers are used for controlling thermal conditions in the fuel cell process and there can be more than one heat exchanger in different locations of a SOFC device. The extra thermal energy in circulating gas is recovered in one or more heat exchangers 105 to be utilized in a SOFC device or externally. Reformer 107 is a device that converts fuel, such as natural gas, to a composition suitable for fuel cells, such as a composition containing all or at least some of the following: hydrogen, methane, carbon dioxide, carbon monoxide, inert gases and water. In each SOFC device, a reformer is optional.

By using measurement means 115 (such as fuel flow meter, current meter and temperature meter), measurements for the operation of the SOFC device are carried out. Only part of the gas used at the anodes 100 is recirculated in the feedback arrangement 109 and the other part of the gas is exhausted 114 from the anodes 100.

Fuel cells are electrochemical devices for converting chemical energy of reactants directly to electricity and heat. Fuel cell systems have the potential to significantly exceed the electrical and CHP (Combined production of Heat and Power) efficiency of traditional energy production technologies of comparable size. Fuel cell systems are widely appreciated as a desirable future energy production technology.

In order to maximize the performance and lifetime of fuel cell systems, accurate control of the fuel cell operating conditions is desired. Fuel cells produce DC current, whereas in higher power systems, AC output can be desired and thus a power conversion from DC to AC is involved. To allow for practical interfacing and current collection from the fuel cells and subsequent power conversion, the fuel cells are manufactured as stacks containing several individual cells connected in series.

In fuel cell systems including several stacks, the electrical interconnection topology of the stacks can be a design parameter. Series connection of several stacks provides for lower cabling and power conversion losses as well as lower cost for components. Electrical isolation limitations as well as the desired operating voltage level of the fuel cell load can, however, limit the feasible amount of stacks to be serially connected. Hence, if higher power levels are desired (e.g., more than what can be achieved with a single string of serial connected stacks) some sort of parallel connection of stacks or groups of stacks can be involved.

When electrical sources such as fuel cells are connected in parallel, uneven load sharing may occur if there are deviations in the electrical characteristics of the individual sources. With fuel cells, this can be an issue since uneven load sharing may reduce the efficiency (due to reduced fuel utilization) and/or significantly deteriorate those fuel cells operating above the average current. Due to inherent variances in series resistance between stacks as well as variations due to age, temperature etc, uneven load sharing to some extent can be expected if stacks are connected directly in parallel. Electrical parallel connection of stacks can be an issue in high temperature fuel cell systems due to intrinsic negative temperature coefficient of their internal resistance. This characteristic can give rise to positive feedback behaviour in the load sharing balance between parallel connected stacks; i.e., a stack with higher current heats up, which tends to increase the current further due to decreased internal resistance. To avoid the current sharing issues, separate converters for each stack or series of stacks have been used, bringing a considerable higher cost to the system.

Fuel cells can have current-voltage characteristics which are far more flexible than that of a battery. Exemplary shape and full operating range 128 of the fuel cell (and for comparison an exemplary shape and full operating range 130 of a battery) are presented in FIG. 3. As seen from FIG. 3, the voltage level at the nominal operation point 124 of the fuel cell can be significantly lower than the maximum voltage of the fuel cell achieved in no- or low-load conditions. Reference number 130 represents the nominal operation window of the battery and reference number 126 represents the nominal operation point of the battery, whereas number 128 depicts the operating window for a fuel cell. As a consequence, power electronics, or more generally loads, interfacing with the fuel cells can deal with a comparatively wide operating voltage window. Fuel cell degradation occurring over the lifetime of the system further reduces voltages at full load involving an even wider operating window. For power electronics, a large voltage window can involve several compromises in terms of component selection and filter dimensioning, both negatively affecting price and efficiency. For example, if the nominal operating window for a fuel cell is about 0.6-0.8V/cell and the open circuit voltage is about 1.1 V/cell, power electronic components can be dimensioned according to the highest voltage although operated most of the time at a lower voltage.

Large fuel cell systems can incorporate a 3-phase inverter for feeding power to a grid or 3-phase load. For an inverter, an optimum input voltage (e.g., DC-link voltage) can be a minimum voltage at which undistorted output can be generated. The theoretical minimum voltage can be the main voltage multiplied by sqrt(2) (e.g., 566V for a 400 VAC grid connection). On top of this voltage, a reasonable voltage margin is desired to compensate for voltage drops in filters, switches and grid voltage variations. An exemplary DC-link setpoint for a 400 VAC inverter can be 625V. Operation above this voltage yields higher switching and filtering losses and higher electromagnetic emissions, whereas operation below this voltage may result in a distorted output. The maximum allowable voltage is determined by the voltage rating of inverter components, for example, 800V for a 400 VAC inverter whereby the maximum voltage, applying an exemplary safety margin of, for example, 20% is 720V.

Feeding power from a fuel cell to an inverter can be carried out by direct connection to the inverter (or other load) or by feeding the fuel cell power through a DC/DC converter stage. If a DC/DC converter is used then the voltage window matching can be done on the DC/DC side and inverter voltage kept optimum at most or all times. Separate DC/DC converters can be used for different groups of fuel cell stacks, whereby each DC/DC converter can control the current of the corresponding stack group to mitigate uneven current sharing issues common for parallel connection of stacks. Introducing the separate DC/DC converters can lead to conversion losses and additional economical cost associated with separate converters.

If fuel cells are connected directly to the load (e.g., inverter) then their voltage (e.g., number of cells), can be chosen such that the output voltage is sufficient even with a minimum output voltage from the fuel cells (e.g., maximum load). Assuming a minimum cell voltage of 0.65, 961 cells are used to produce an inverter voltage of 625V. At no-load conditions with a cell voltage of about 1.1V, the output voltage is 1058V. This involves the use of at least 1200V rated components in the inverter, for example, even higher voltage rating rather than 800V components. Furthermore, the inverter operates at optimum voltage only at end of life conditions. These compromises can add costs and decrease efficiency of the inverter. A lack of active means exists to control the current sharing between stacks connected in parallel. Particularly high temperature fuel cells are susceptible to uneven current sharing in such cases when their series resistance has a negative temperature coefficient causing differences in current sharing. The stack or group of stacks providing a higher load may be overstressed and suffer accelerated non-reversible degradation.

SUMMARY

An offset control arrangement for controlling voltage values of a fuel cell system for producing electricity with fuel cells is disclosed, each fuel cell in the fuel cell system including an anode side, a cathode side and an electrolyte between the anode side and the cathode side, the offset control arrangement and fuel cell system comprising: at least one fuel cell array of at least two fuel cells, and at least one load for performing a load function; voltage monitoring means for monitoring input voltage of the load to obtain monitoring information; a control processor for processing the monitoring information; at least one offsetting source in serial connection to the at least one fuel cell array; a power level of the offsetting source being substantially low compared to a power level of the fuel cell array, the offsetting source being arranged to perform at least unidirectional shifting of a fuel cell array output voltage to reduce a voltage window apparent to the load based on at least one of the monitoring information and the processed monitoring information; and means for disconnecting the at least one fuel cell array from the load, when a reason for disconnection is detected in the input voltage monitoring of the load by detecting that the input voltage rises out of a specified bound.

An offset control method for controlling voltage values in a fuel cell system for producing electricity with fuel cells is disclosed, each fuel cell in the fuel cell system having an anode side, a cathode side and an electrolyte between the anode side and the cathode side, the method comprising: monitoring an input voltage of a load of the fuel cell system to obtain monitoring information, which is processed, at least one offsetting source being connected in serial connection to at least one fuel cell array, a power level of the offsetting source being substantially low compared to the power level of the fuel cell array; performing at least unidirectional shifting of a fuel cell array output voltage by the at least one offsetting source to reduce a voltage window apparent to the load based on at least one of the monitoring information and the processed monitoring information; and disconnecting the at least one fuel cell array from the load when a reason for disconnection is detected in the input voltage monitoring of the load by detecting that the input voltage rises out of a specified bound.

DETAILED DESCRIPTION

Figure 1:
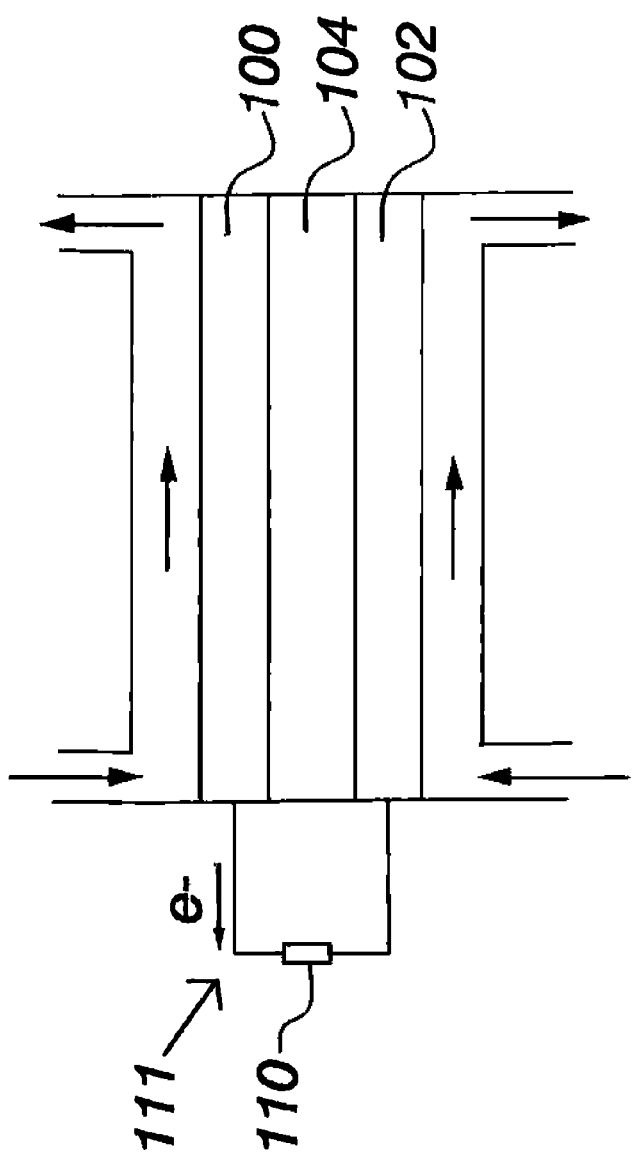
FIG. 1 shows an exemplary single fuel cell structure.
Figure 2:
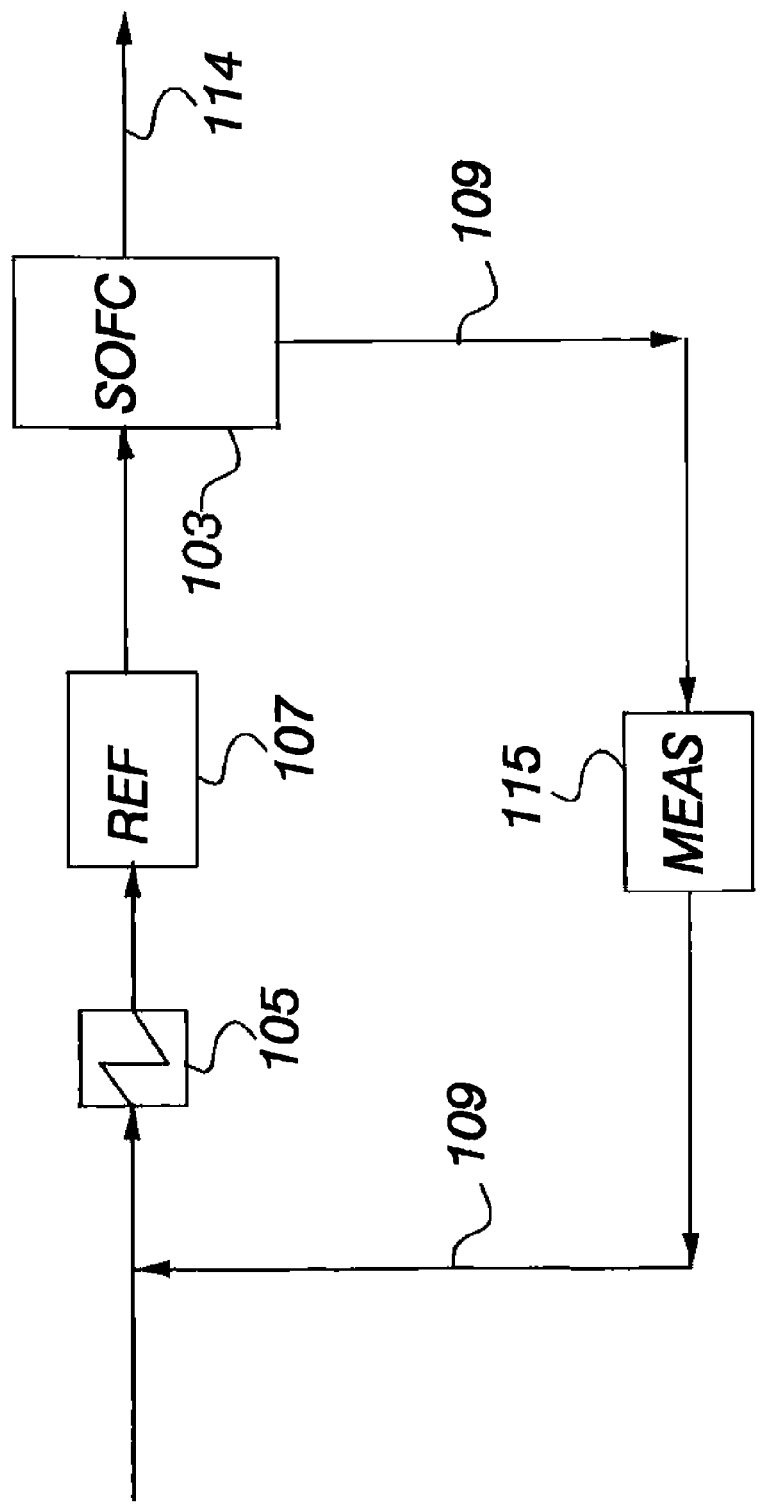
FIG. 2 shows an example of a SOFC device.
Figure 3:
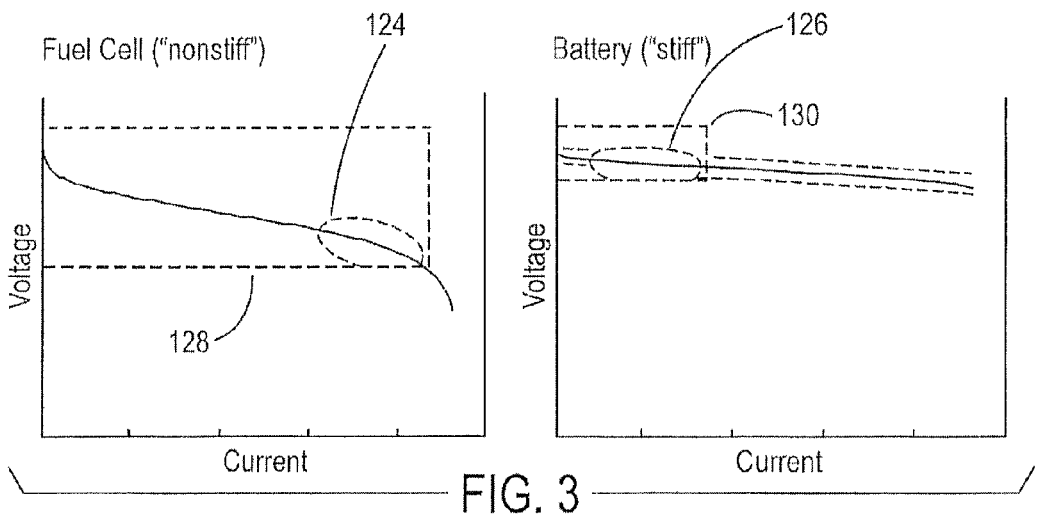
FIG. 3 shows an exemplary shape and operating range of a fuel cell in comparison with an exemplary shape and operating range of a battery.

Exemplary embodiments of a fuel cell system are disclosed wherein improved efficiency and controllability of the fuel cell system can be achieved in an economically friendly manner and with possibility to obtain a compact physical size of the fuel cell system. This can be achieved by an offset control arrangement for controlling voltage values in a fuel cell system for producing electricity with fuel cells, each fuel cell in the fuel cell system including an anode side, a cathode side and an electrolyte between the anode side and the cathode side. The fuel cell system can include at least one fuel cell array of at least two fuel cells, and at least one load for performing a load function. The offset control arrangement can include voltage monitoring means for monitoring input voltage of the load to obtain monitoring information, a control processor for processing the monitoring information, and at least one offsetting source in serial connection to the at least one fuel cell array, a power level of the offsetting source being substantially low compared to the power level of the fuel cell array, and the offsetting source being arranged to perform at least unidirectional shifting of fuel cell array output voltage to reduce the voltage window apparent to the load on the basis of at least one of the monitoring information and the processed monitoring information. The offset control arrangement can further include means for disconnecting the at least one fuel cell array from the load when a reason for the disconnection is detected in the fuel cell system.

An offset control method is disclosed for controlling voltage values in a fuel cell system for producing electricity with fuel cells, each fuel cell in the fuel cell system including an anode side, a cathode side and an electrolyte between the anode side and the cathode side. In the method, input voltage of a load of the fuel cell system can be monitored to obtain monitoring information, which is processed. At least one offsetting source is connected in serial connection to an at least one fuel cell array, power level of the offsetting source being substantially low compared to the power level of the fuel cell array. At least unidirectional shifting of fuel cell array output voltage can be performed by the at least one offsetting source to reduce voltage window apparent to the load on the basis of at least one of the monitoring information and the processed monitoring information. The at least one fuel cell array can be disconnected from the load when a reason for the disconnection is detected in the fuel cell system.

The disclosure can be based on an offset control arrangement in serial connection to at least one fuel cell array in a fuel cell system, a power level of the offsetting being substantially low compared to the power level of the fuel cell array. At least unidirectional shifting of fuel cell array output voltage is arranged by the offsetting to reduce the voltage window apparent to the load on the basis of monitored information of input voltage of the load of the fuel cell system. The disclosure can be further based on disconnecting the at least one fuel cell array from the load when a reason for the disconnection is detected in the fuel cell system.

An exemplary benefit of the disclosure is that by utilizing a considerably small amount of compensating power, a desired control capacity can be achieved with significant savings in cost, physical size and operational power losses. Benefits of the present disclosure can also include improved controllability and improved lifetime of the fuel cells.

Figure 5:
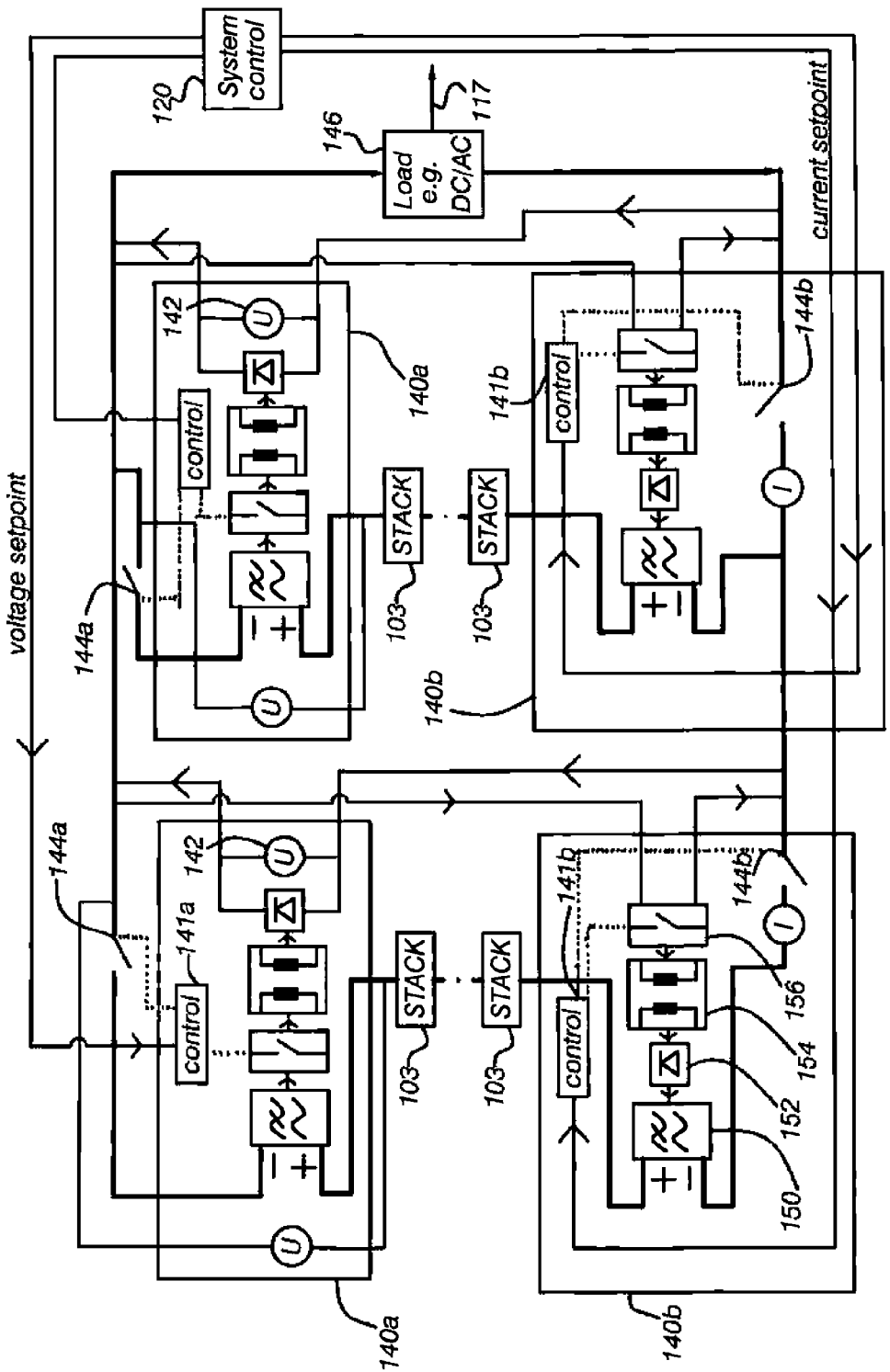
FIG. 5 shows an exemplary embodiment according to the present disclosure.

An exemplary arrangement according to the disclosure includes offsetting sources 140 of FIG. 5, which are dimensioned to be able to together source or sink a voltage in the range of about −0.2V/cell up to about 0.13V/cell, to, for example, provide a respective compensational offset voltage to the voltage of the fuel cell array 103. Placed in series with a fuel cell array and designed for accurate and rapid control of the total output voltage of the series, the output voltage of the fuel cell array combined with the offsetting sources 140 can be reduced from about 0.65-1.1V per cell to, for example, effectively about 0.78-0.9V per cell from the load's perspective. For an exemplary 800 cells, this translates to an exemplary voltage window of 624-720V, which is an acceptable voltage window for an exemplary 400 VAC inverter with 800V rated components. Since the voltage sourced or sank in the compensation source is only a fraction of the total cell voltage and the current is the same for the fuel cell array, the power rating of the offsetting source is also only a fraction of that of the fuel cell array. Consequently, cost and losses are also only a fraction compared to a separate DC/DC converter handling the full power of the individual fuel cell array.

When the arrangement according to the disclosure includes several fuel cell arrays 103, a separate offsetting source 140 can be arranged for each array. The sources connected to different arrays can be configured to provide different offset voltages to compensate for possible differences in voltage of the arrays. The disclosure also provides efficient means for actively controlling current sharing between substantially paralleled fuel cell arrays at a low cost. However, the benefits of the method and arrangement of this disclosure are not limited to current sharing compensation.

The arrangement according to the present disclosure is capable of providing a significant voltage, which can be small in comparison to fuel cell array voltage. The arrangement can also be combined with a sophisticated control processor. This arrangement can provide instantaneous voltage offsetting, which can be large enough to reduce the effective voltage window of a fuel cell array to within acceptable variation bounds for a standard inverter.

FIG. 5 presents an exemplary embodiment according to the present disclosure, with exemplary numerical values. The offset compensation voltage range can be unipolar (e.g., 0-0.3V/cell) strictly upward or downward compensation. In this example, the fuel cell stack array 103 can be dimensioned to provide about 720V at open circuit conditions (e.g., approximately 655 cells) whereby the minimum voltage would be 0.65V*654=426V, whereby an offset of 199V or approximately 0.3V/cell upward would be desired at minimum voltage conditions. Alternatively, the cell could be traditionally dimensioned to produce 625V at minimum voltage conditions (e.g., 961 cells), whereby at open load conditions the offset compensation specification can be 961*1.1V−720V=337V, or approximately 0.35V/cell downward. For an optimum performance, however, a bipolar offset compensation can be used, minimizing the power rating of the offsetting source(s) 140 (140a, 140b in FIG. 5) and minimizing the need for compensation during exemplary operating conditions. A bipolar offset compensation capability can be realized with a single device capable of bipolar output voltage, or alternatively, two unipolar devices in series with mutually reversed polarities. For the exemplary compensation voltage range of approximately 0.12V/cell-0.2V/cell, voltage compensation is desired in the ranges Ucell>0.9V or Ucell<0.77V. Therefore, a large part of the desired operation range (e.g., 0.75-0.85V) can be handled without compensation and hence virtually without loss. For the downward compensation voltage range, Ucell>0.9V cell currents are less than nominal, presumably 50-60% or less than nominal, whereby the power rating desired for a −0.2V negative offset value can essentially be equal to the power rating corresponding to a 0.12V positive offset value at full current.

If two offsetting sources 140 are connected in series, for stability reasons, one can be voltage controlled, whereas the other one could be voltage controlled as well or implement current control to facilitate accurate active current sharing control. For instance, the negative offsetting source 140a can be voltage controlled and active during start-up, whereas the positive offsetting source 140b can operate in current controlled mode most or all the time. Thus, except for purely open circuit conditions when positive voltage offsetting on top of the negative voltage offsetting may not be allowed, current sharing control can be accomplished by the at least one positively offsetting source 140b. A multiple stack array 103 configuration can be arranged such that each array 103 has a dedicated positively offsetting source 140b, whereas a common negatively offsetting source 140a can be used.

Referring to the exemplary embodiment of FIG. 5, the inverter 146 can operate in a voltage controlled mode where the voltage of the DC-link can be maintained at a setpoint provided by the fuel cell system control processor 120. In start-up conditions, the DC-voltage setpoint can be the maximum value, for example 720V, whereby the negatively offsetting source can provide up to open circuit voltage for the fuel cells. Control, such as increasing of the stack current, can then be accomplished by controlling (e.g., reducing) the voltage setpoint of the negatively offsetting source 140a, whereby current starts flowing from the stacks to the load, and by this way, an inverting operation is accomplished. To facilitate current sharing control, the control processor provides a current setpoint to the positively offsetting source 140*b* and controls the voltage of the negatively offsetting source 140*a* such that for the best performing stack array 103, little or no positive offsetting is required. As current is ramped up to the negatively offsetting voltage then gradually decreases down to zero whereafter voltage reduction can continue by reducing the DC-link setpoint down towards its minimum (625V) according to an exemplary performing stack array. As the minimum DC-link voltage is reached and stack voltage continues to drop, the positively offsetting sources 140*b*, operating in current controlled mode, will then start supplying more and more positive voltage offset to maintain the desired current. Thus, the voltage of the stack arrays can decrease below the minimum DC-link voltage until the worst performing array has reached the minimum average cell voltage, (e.g., 0.65V=>520V for 800 cells).

Figure 4:
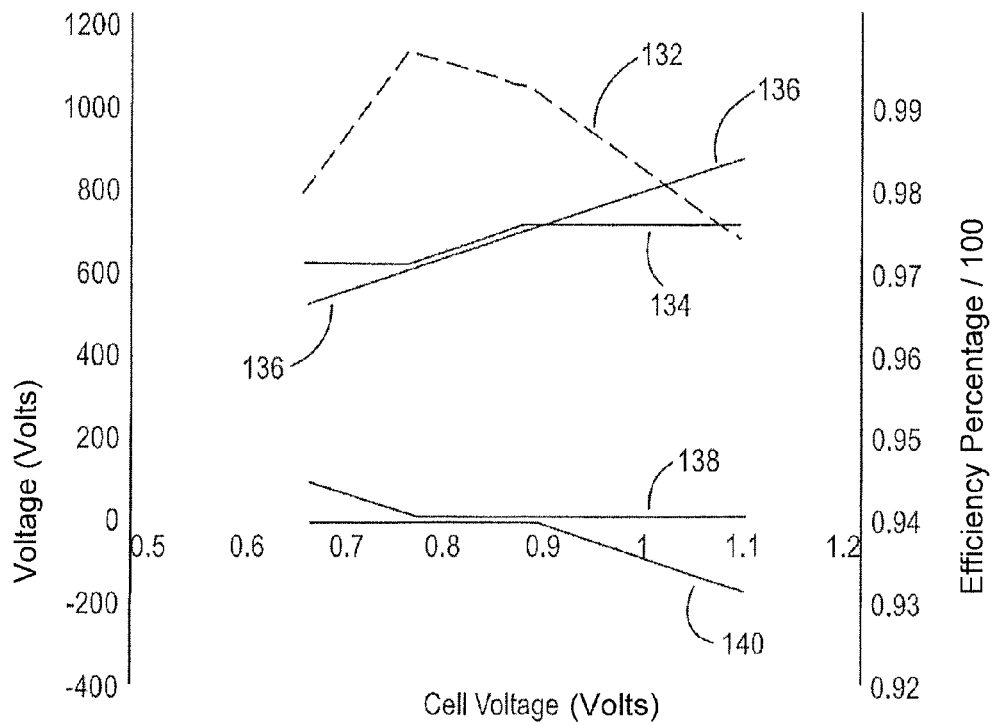
FIG. 4 shows exemplary voltage curves of a fuel cell array 103, DC-link and positive and negative offsetting sources 140*b*, 140*a* as disclosed herein.

Examplary voltage curves of the fuel cell stack array 103, DC-link, and positive and negative offsetting sources 140*b*, 140*a* according to the disclosure are presented in FIG. 4. Reference number 132 represents an efficiency curve, 134 represents a voltage curve of the DC-link, 136 represents a fuel cell voltage curve, 138 represents a positive offset curve and 140 represents a negative offset curve. Related to FIG. 4, the difference in voltage between different arrays 103 is on average 10V, which is compensated at voltage levels by the positive offsetting source 140*b*. The energy throughput efficiency from the stacks has been calculated assuming a very moderate conversion efficiency of 90% for the compensating sources, a minimum voltage loss of, for example, 1.0V for each of the compensation sources and an exemplary incremental inverter loss of 0.5% when operating at 720V rather than 625V.

As seen from FIG. 4, a throughput efficiency in excess of 99% can be achieved at a large part of the nominal operating range while still maintaining individual current controllability of each stack array. By increasing the modest efficiency of the DC/DC converters or by adding bypass contactors over the offsetting sources when either source is inactive, the efficiency can easily be even further improved.

Known solutions where a 1200V or 1300V rated inverter would be used to supply a 400V grid, the losses due to off-optimal operating voltage and off-optimal power electronics components are estimated to be in the range of 2-4%. Thus, from an overall power throughput point of view, the method and arrangement disclosed herein can have a slight efficiency benefit. The benefits can be, however, not only limited to efficiency but also include reduced cost due to the ability to use standard 800V inverter gear as well as improved controllability, and hence, most likely improved lifetime of stacks. Compared to the known art arrangement using individual buck or boost DC/DC converters separately for each stack array, both efficiency and cost characteristics are clearly better in the presented arrangement according to the disclosure.

Proper means 144 for disconnecting the fuel cell stack arrays 103 from the inverter 146 in fault situations are desired for the operability and safety of the arrangement. The inverter input voltage can be actively monitored and disconnection can take place within tens of milliseconds if the voltage rises outside of a specified bound. For example, voltage monitoring means 142 of the inverter 146 DC-link can be included in the negatively offsetting source 140 *a* by utilizing as the monitoring means 142 *a* control circuitry 141 *a* of the negatively offsetting source 140 *a*, which control circuitry 141 *a* controls a first main fuel cell array contactor 144 *a* (FIG. 5) as means 144 for disconnecting the fuel cell stack arrays 103 from the inverter 146. Thus, immediate disconnection can take place without immediate action from the fuel cell system control processor 120 in case of a sudden voltage rise due to loading discontinuation of stacks or failure in one or more of the offsetting sources 140 *a*, 140 *b*. A second contactor 144 *b* for bipolar disconnection of the FC stack can be controlled by the same signal or alternatively controlled separately by monitoring means 142 in the positively offsetting source 140 *b*.

The following is a summary of the exemplary embodiment presented in FIG. 5. A fuel cell array 103 includes, for example, at least two serial connected fuel cell stacks, and the fuel cell system can have two or more parallel connected fuel cell arrays 103. The fuel cell system includes at least one load 146 for performing a load function, and in the exemplary embodiment the load is an inverter (e.g. a DC/AC inverter) for performing inverting operations. In FIG. 5, the at least one load 146 is connected to a grid as denoted by reference number 117. The offset control arrangement includes voltage monitoring means 142 for monitoring input voltage of the inverter 146 to obtain monitoring information, and a fuel cell system control processor 120 for processing the monitoring information. The offset control arrangement includes offsetting sources 140 *a*, 140 *b* serially connected to the at least one fuel cell array 103, such that a power level of the offsetting sources 140 *a*, 140 *b* being substantially low compared to the power level of the fuel cell array 103. In an exemplary embodiment of the disclosure, these offsetting sources (e.g., the negatively offsetting source 140 *a* and the positively offsetting source 140 *b*) are arranged to perform bidirectional shifting (e.g., negative and positive offset) of fuel cell array output voltages to reduce the voltage window apparent to the inverter 146 on the basis of at least one of the monitoring information and the processed monitoring information. The control circuitry 141 *a* of the negatively offsetting source 140 *a* is, for example, utilized as the monitoring means 142, which control circuitry 141 *a* controls at least one main fuel cell array contactor 144 *a*, which can be used as means 144 for disconnecting the at least one fuel cell array 103 from the load 146 when a reason for such disconnection is detected in the fuel cell system by the monitoring.

In an exemplary embodiment according to the disclosure, the offset control arrangement includes at least one separate offsetting source 140 for each array 103 that provides individual offset values to compensate for differences in voltage values between the arrays 103. The exemplary offset control arrangement includes a positive offsetting source 140 *b* with control circuitry 141 *b* for providing at least a positive offsetting value for the at least one fuel cell array 103 primarily for end of life operation, and a negative offsetting source 140 *a* with control circuitry 141 *a* for providing at least negative offsetting value for the at least one fuel cell array 103 to eliminate substantially high voltage peaks of the inverter 146. An exemplary embodiment the offset control arrangement includes a separate positively offsetting source 140 *b* for each fuel cell array 103, and a common negatively offsetting source 140 *a* for most or all arrays 103.

Common symbols inside offsetting source boxes (140*a*, 140*b*) include: reference sign 150 which refers to filtering stage, 152 which refers to rectification stage, 154 which refers to high frequency transforming stage and 156 which refers to a stage of controllable switches.

Furthermore, in an exemplary embodiment, the offset control arrangement includes the fuel cell system control processor 120 for accomplishing current sharing control between the at least two fuel cell arrays 103 by providing at least one of current setpoint and voltage setpoint to a positively offsetting source 140b for continuous operation of the fuel cell system, and by controlling at least one of voltage and current of a negatively offsetting source 140a so that for the best performing fuel cell array 103, little or no positive offsetting is accomplished. The negatively offsetting source 140a can be active during start-up process of the fuel cell system.

In exemplary embodiments according to the disclosure, the offset control arrangement can include a single offsetting source 140 capable of bipolar output voltage for performing bipolar offset compensation of the fuel cell array 103. Also, according to the disclosure the offset control arrangement can include two unipolar offsetting sources 140 serially connected and with mutually reversed polarities for performing bipolar offset compensation of the array 103.

The use of the offsetting voltage source 140a, 140b principle may not limited to grid voltages, number of cells and/or cell voltage range provided above. The principle can be scaled to be applied for any grid voltage (e.g., 200V up to 480V) and fuel cell technology. Also, the principles according to the disclosure can be used for systems connected to a mid-voltage utility through a transformer. The control processor 120 can include different kinds of analogical and/or digital electronic implementations that can be, for example, based on a programmable processor.

In addition to SOFCs, the present disclosure can also be utilized with MCFCs (Molten Carbonate Fuel Cells) and other fuel cells. MCFCs are high temperature fuel cells that use an electrolyte composed of a molten carbonate salt mixture suspended in a porous, chemically inert ceramic matrix. Also, the fuel cell system can eliminate a feedback arrangement.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An offset control arrangement for controlling voltage values of a fuel cell system for producing electricity with fuel cells, each fuel cell in the fuel cell system including an anode side, a cathode side and an electrolyte between the anode side and the cathode side, the offset control arrangement and fuel cell system comprising:
at least one fuel cell array of at least two fuel cells, and at least one load for performing a load function;
control circuitry for at least one offsetting source for monitoring input voltage of the load to obtain monitoring information;
a control processor programmed to monitor the information;
the at least one offsetting source in serial connection to the at least one fuel cell array;
a power level of the at least one offsetting source being substantially low compared to a power level of the fuel cell array, the at least one offsetting source being arranged to perform at least unidirectional shifting of a fuel cell array output voltage to reduce a voltage window apparent to the load based on at least one of the monitoring information and the processed monitoring information; and
disconnection means for disconnecting the at least one fuel cell array from the load, when a reason for disconnection is detected in the input voltage monitoring of the load by detecting that the input voltage rises out of a specified bound.

2. An offset control arrangement and fuel cell system in accordance with claim 1, wherein:
the at least one fuel cell array comprises at least two electrically parallel connected fuel cell array each comprising at least one separate offsetting source for providing individual compensation for each array.

3. An offset control arrangement and fuel cell system in accordance with claim 2, comprising:
a common offsetting source of opposite polarity than the separate offsetting source for all arrays or for most of the arrays.

4. An offset control arrangement and fuel cell system in accordance with claim 2, comprising:
the control processor is programmed to share current control between the at least two fuel cell arrays by providing at least one of a current setpoint and a voltage setpoint to a positively offsetting source for continuous operation of the fuel cell system and for controlling at least one of voltage and current of a negatively offsetting source so that for a best performing fuel cell array, little or no positive offsetting is accomplished, wherein the negatively offsetting source is active during a start-up process of the fuel cell system.

5. An offset control arrangement and fuel cell system in accordance with claim 1, wherein the at least one offsetting source comprises:
a negative offsetting source programmed to provide at least negative offsetting value for the at least one fuel cell array.

6. An offset control arrangement and fuel cell system in accordance with claim 1, wherein the at least one offsetting source comprises:
a positive offsetting source programmed to provide at least positive offsetting value for the at least one fuel cell array for end of life operation.

7. An offset control arrangement and fuel cell system in accordance with claim 1, wherein the at least one offsetting source comprises a negative offsetting source comprising:
control circuitry for voltage monitoring, which control circuitry controls at least one main fuel cell array contactor for disconnecting the at least one fuel cell array from the load, when a reason for the disconnection is detected in the fuel cell system by the monitoring.

8. An offset control arrangement and fuel cell system in accordance with claim 1, comprising:
a single offsetting source programmed to provide a bipolar output voltage for performing bipolar offset compensation.

9. An offset control arrangement and fuel cell system in accordance with claim 1, wherein:
the at least one offsetting source comprises two unipolar offsetting sources in series and with mutually reversed polarities programmed to perform bipolar offset compensation.

10. An offset control method for controlling voltage values in a fuel cell system for producing electricity with fuel cells, each fuel cell in the fuel cell system having an anode side, a cathode side and an electrolyte between the anode side and the cathode side, the method comprising:
monitoring an input voltage of a load of the fuel cell system to obtain monitoring information, which is processed, at least one offsetting source being connected in serial connection to at least one fuel cell array, a power level of the offsetting source being substantially low compared to the power level of the fuel cell array;

performing at least unidirectional shifting of a fuel cell array output voltage by the at least one offsetting source to reduce a voltage window apparent to the load based on at least one of the monitoring information and the processed monitoring information; and disconnecting the at least one fuel cell array from the load when a reason for disconnection is detected in the input voltage monitoring of the load by detecting that the input voltage rises out of a specified bound.

11. An offset control method in accordance with claim 10, comprising:

performing at least unidirectional shifting of fuel cell array output voltage by at least one separate offsetting source in at least two electrically parallel connected fuel cell arrays to provide individual compensation for each array.

12. An offset control method in accordance with claim 10, comprising:

providing at least a negative offsetting value for the at least one fuel cell array by a negative offsetting source.

13. An offset control method in accordance with claim 10, comprising:

providing at least positive offsetting value for the at least one fuel cell array for end of life operation by a positive offsetting source.

14. An offset control method in accordance with claim 10, comprising:

providing one separate offsetting source for each fuel cell array; and providing a common offsetting source of opposite polarity than the separate offsetting source for most or all of the arrays.

15. An offset control method in accordance with claim 10, comprising:

providing current sharing control between at least two fuel cell arrays by providing at least one of a current setpoint and a voltage setpoint to a positively offsetting source for continuous operation of the fuel cell system, and by controlling at least one of voltage and current of a negatively offsetting source so that for a best performing fuel cell array, little or no positive offsetting is accomplished, wherein the negatively offsetting source is active during start-up process of the fuel cell system.

16. An offset control method in accordance with claim 10, comprising:

monitoring input voltage of a load of the fuel cell system by using a control circuitry of a negatively offsetting source in the monitoring to control at least one main fuel cell array contactor for disconnecting the at least one fuel cell array from the load when a reason for disconnection is detected in the fuel cell system by the monitoring.

17. An offset control method in accordance with claim 10, comprising:

providing a bipolar output voltage of the single offsetting source to perform bipolar offset compensation.

18. An offset control method in accordance with claim 10, comprising:

connecting two unipolar offsetting sources in series with mutually reversed polarities to perform bipolar offset compensation.

* * * * *

UNITED STATES PATENT AND TRADEMARK OFFICE
CERTIFICATE OF CORRECTION

| | | |
|---|---|---|
| PATENT NO. | : 9,005,831 B2 | Page 1 of 1 |
| APPLICATION NO. | : 14/137625 | |
| DATED | : April 14, 2015 | |
| INVENTOR(S) | : Kim Astrom | |

It is certified that error appears in the above-identified patent and that said Letters Patent is hereby corrected as shown below:

Title Page, Please insert

--(30) Foreign Application Priority Data

April 20, 2012  (WO)..................................PCT/FI2012/050396

June 23, 2011  (FI).....................................20115669--

Signed and Sealed this
Eighteenth Day of August, 2015

Michelle K. Lee
*Director of the United States Patent and Trademark Office*